Nov. 22, 1960    L. LEITZ    2,960,907
RANGE FINDER
Filed May 20, 1958
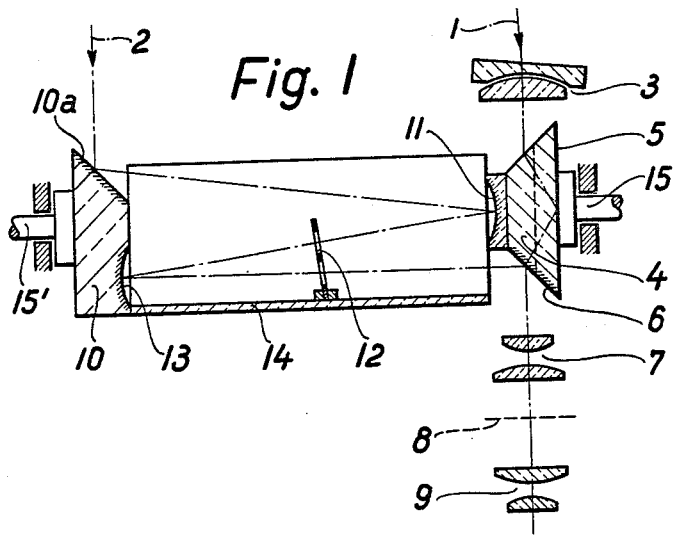
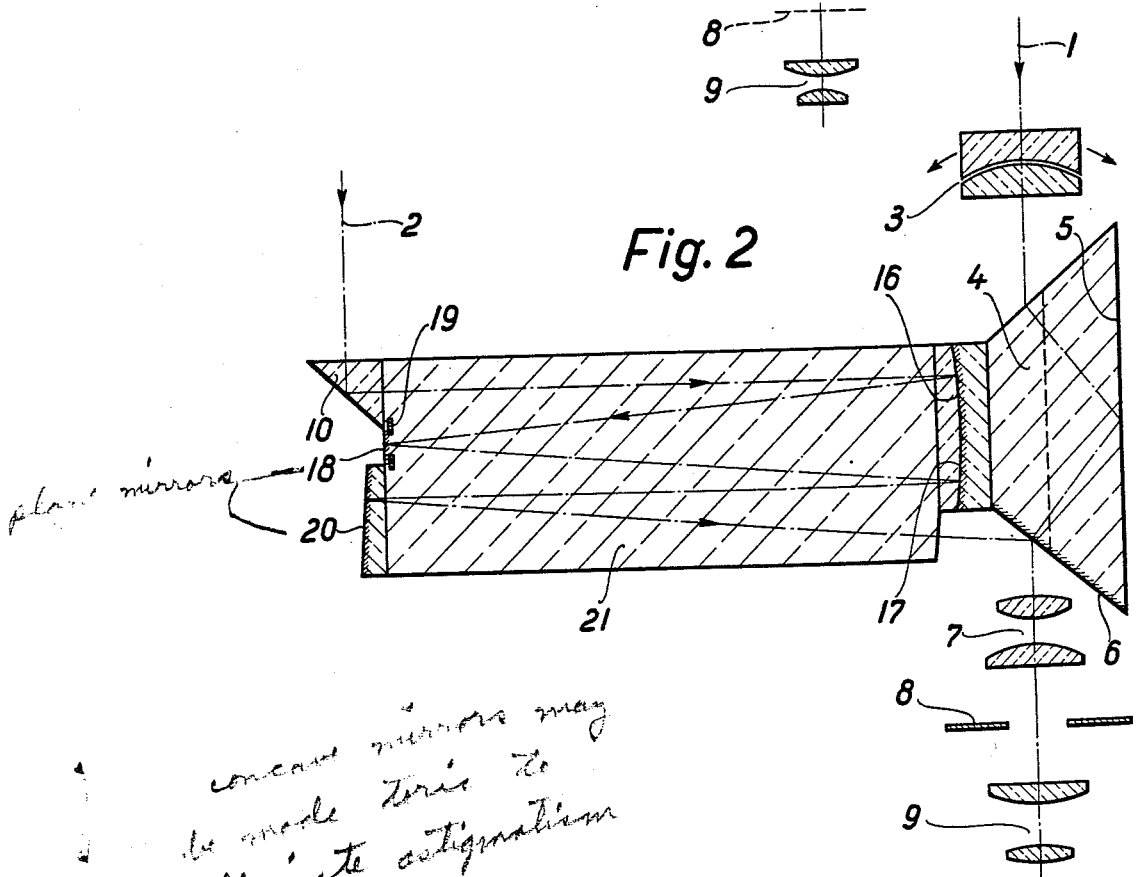
INVENTOR.
LUDWIG LEITZ
BY Toulmin & Toulmin
ATTORNEYS

United States Patent Office 2,960,907
Patented Nov. 22, 1960

2,960,907

RANGE FINDER

Ludwig Leitz, Wetzlar (Lahn), Germany, assignor to Ernst Leitz G.m.b.H., Wetzlar (Lahn), Germany Filed May 20, 1958, Ser. No. 736,593

Claims priority, application Germany May 23, 1957

5 Claims. (Cl. 88—2.7)

The present invention relates to range finders and more in particular to range finders in which the adjusted position and hence the measured value are insensitive to small changes in position.

It is known to provide range finders of the type referred to as, for example, the biaxial collimator or the pair of rhombic mirrors. It is, of course, possible to provide a pair of rhombic mirrors forming one integral piece as a prism, relative changes in position of the two mirrors being of necessity excluded. However, this construction can only be used in coincidence range finders where no intermediate image is produced.

It is an object of the present invention to provide a range finder in which there is produced an intermediate image and which is insensitive to small changes in position in regard to its adjustment and the measured value.

It is a further object of the present invention to provide a range finder in which there is produced an intermediate image and which is insensitive to small changes in position in regard to its adjustment and the measured value, in which astigmatism is prevented and wherein— if used in a camera—a parallax between the axis of the objective of the camera and the direction of the view finder can be compensated.

Other objects and advantages of this invention will become apparent upon reference to the accompanying description when taken in conjunction with the following drawings wherein:

Figure 1 is a side elevational view of the range finder-seeker of the invention with separate concave mirrors;

Figure 2 is a side elevational view showing another embodiment of the range finder-viewer of the invention with combined concave mirrors.

The invention initially comprises an even number of concave reflecting surfaces, e.g. mirrors, and an odd number of plane mirrors, an intermediate image being produced between the concave mirrors. According to one embodiment of the invention there are disposed two concave mirrors opposite to each other and there is provided a field stop between the two concave mirrors where the intermediate image is produced.

According to another embodiment of the invention two concave reflecting surfaces form an integral spherical surface and a plane mirror bearing the field stop is disposed in the focal point of this integral spherical surface.

If the range finder is combined with a viewer only the first half of the same comprises concave mirrors whereas the other half producing a greater field of view is formed by a reversal system.

According to a preferred embodiment of the present invention the reversal system comprises a Dove-prism with a roof disposed in the course of rays of the viewer. Furthermore, the entrance plane mirror and one concave mirror may form one integral piece and another concave mirror can be firmly attached to the Dove-prism.

Referring now to the drawings somewhat more in detail, wherein like reference numerals indicate the same parts throughout various views, the embodiment of the invention illustrated in Figure 1 comprises an integral piece 10 having a slanted reflector surface 10a forming a plane mirror and at its lower portion a concave mirror 13. The end of the integral piece 10 having this mirror 13 is attached to a support body 14 having a U-shaped cross section and preferably composed of glass or quartz. At the other end, i.e. opposite to the concave mirror 13 there is provided a Dove-prism 4 having roof 5 and at its lower portion a semi-transparent surface 6. The prism also has a concave mirror 11 attached to the support body 14. A field stop 12 is disposed between the concave mirrors 11 and 13, respectively. The entire system is rotatably positioned on the shafts 15, 15'. Above the prism 5 there is provided a range finding Abat-wedge 3 and below the prism there is provided an objective lens system 7 and an ocular lens system 9.

In operation, the pencil of rays 1 forms one pencil of rays of the base range finder, the other pencil of rays of the range finder being designated as 2. The rays 2 are reflected by the plane mirror 10a to the first concave mirror 11 which produces an intermediate image where the field stop 12 is disposed. The second concave mirror 13 reflects this inverted intermediate image to infinity and after reflection it coincides with the image of the rays 1 and the mirror 6 of the prism 4. If the system does not comprise image forming lenses in the course of rays 1, the system 10a, 11, 12, 13 must form a telescope with the enlargement factor one, i.e., a unit power telescope. Both pencils of rays 1 and 2 produce in front of the objective 7 an inverted image in infinity and the objective 7 thus produces an upright image in the image plane 8 of ocular 9.

In the embodiment shown in Figure 2, the concave mirrors 16 and 17 form the upper and lower portions, respectively, of an integral spherical surface. The focal length of the mirrors 16 and 17 is greater than the focal length of the concave mirrors 11 and 13 in the embodiment shown in Figure 1. The plane mirror 18 is disposed opposite to the concave mirrors 16 and 17 and receives a real intermediate image. A field stop 19 can be positioned on the plane mirror 18. The concave mirror 16 functions as the objective and concave mirror 17 as the ocular of an astronomical telescope. The plane mirror 20 is arranged opposite to the concave mirror 17 and reflects the pencil of rays 2 to the semi-transparent mirror 6. The lens piece having a spherical surface forming the concave mirrors 16 and 17 and the Dove-prism 4 are attached to one end of a block of glass 21, the other end bearing the prism 10 and the mirrors 18 and 20.

If used in a camera, a rotation of the system about shafts 15, 15' will compensate a parallax between the axis of the objective of the camera and the direction of the viewer.

Where the range finder of the invention is used as a fire control instrument, the rotation about shafts 15, 15' can be used for administering the angle of elevation.

The field stops 12 and 19, respectively, facilitate the range finding and adjustment as the beam of rays 2 appears in the image plane 8 with a sharp delimitation. Furthermore, the horizontal delimiting lines enable an adjustment as in a coincidence-range finder with divided field.

It is also possible to reflect into the image plane 8, in a manner known per se, an image-delimitation of the pencil of rays of the viewer, the scale of the angle of elevation, exposure meter, and depth of focus indicator.

If desired, the surfaces of the concave mirrors may be made toric to prevent astigmatism.

The entire structure of the range finder of the invention forms a firm assembly of optical elements highly insensitive to undesirable displacement.

It will be understood that this invention is susceptible to modification in order to adapt it to different usages and conditions, and, accordingly, it is desired to comprehend such modifications within this invention as may fall within the scope of the appended claims.

What I claim is:

1. A base range finder comprising a support body; an integral reflecting element having an angled plane reflecting surface and a concave mirror formed therein carried at one end of said support body; a Dove prism having a roof, an angled semi-transparent mirror surface and a concave mirror mounted thereon carried at the other end of said support body; said support body, integral reflecting element and Dove prism forming a compact assembly and defining the base of said range finder; an adjustable light deviating means provided adjacent said Dove prism on one side of said assembly opposite the semitransparent mirror surface of said Dove prism; an astronomical telescope provided opposite said light deviating means on the other side of said assembly adjacent said semi-transparent mirror surface of said Dove prism, whereby a first ray path through the range finder is established respectively by the angled surface of said integral reflector, the concave mirror mounted on said Dove prism, the concave mirror formed in said integral element, the semi-transparent mirror of said Dove prism and the astronomical telescope; and a second ray path is established respectively by the light deviating means, the Dove prism and the astronomical telescope, said semi-transparent surface of said Dove prism serving to combine said first and second ray paths and said light deviating means serving to deviate said second ray path to bring about coincidence of said first and second ray paths at said semi-transparent mirror surface.

2. A base range finder as claimed in claim 1 wherein said light deviating means is an adjustable Abat wedge.

3. A base range finder as claimed in claim 1, further comprising a field stop fixed to said support body and being arranged in the path of said first ray path so that a real intermediate image is produced at said field stop.

4. A base range finder comprising a block of glass, said block having on one side thereof a reflecting element comprising an angled plane reflecting surface, an upper plane mirror carrying a field stop on its reflecting surface for receiving a real intermediate image, and a lower plan mirror, and said block having on the other side thereof a Dove prism having a roof, an angled semi-transparent mirror surface, and a pair of interengaging concave mirrors intermediate said block and said Dove prism, an adjustable light deviating means provided adjacent said Dove prism on one side of said assembly opposite the semi-transparent mirror surface of said Dove prism; an astronomical telescope provided opposite said light deviating means on the other side of said assembly adjacent said semi-transparent mirror surface of said Dove prism, whereby a first ray path through the range finder is established respectively by the angled plane reflecting surface, the pair of interengaging concave mirrors of the Dove prism, the upper plane mirror carrying a field stop on its reflecting surface, again the pair of interengaging concave mirrors, the lower plane mirror, the semi-transparent mirror and the astronomical telescope; and a second ray path is established respectively by the light deviating means, the Dove prism and the astronomical telescope, said semi-transparent surface of said Dove prism serving to combine said first and second ray paths and said light deviating means serving to deviate said second ray path to bring about coincidence of said first and second ray paths at said semi-transparent mirror surface.

5. A base range finder as claimed in claim 4 wherein said light deviating means is an adjustable Abat wedge.

References Cited in the file of this patent

UNITED STATES PATENTS

| | | |
|---|---|---|
| 1,552,451 | Roach | Sept. 8, 1925 |
| 1,578,899 | Lohmann | Mar. 30, 1926 |
| 1,992,534 | Leitz | Feb. 26, 1935 |
| 2,068,829 | Albada | Jan. 26, 1937 |
| 2,231,734 | Ort | Feb. 11, 1941 |
| 2,373,406 | Luboshez | Apr. 10, 1945 |
| 2,409,186 | Bouwers | Oct. 15, 1946 |
| 2,867,151 | Mandler | Jan. 6, 1959 |

FOREIGN PATENTS

| | | |
|---|---|---|
| 846,959 | France | June 19, 1939 |
| 222,830 | Switzerland | Nov. 2, 1942 |
| 132,595 | Sweden | Aug. 7, 1951 |
| 745,354 | Germany | Mar. 21, 1944 |
| 746,756 | Germany | Aug. 23, 1944 |
| 838,540 | Germany | May 8, 1952 |